2,985,668
PREPARATION OF OLEFIN OXIDES

Haruo Shingu, 38 Shimokamo-Higashi Kishimotocho, Sakyoku, Kyoto City, Japan

No Drawing. Filed Jan. 30, 1957, Ser. No. 637,093

10 Claims. (Cl. 260—348.5)

This invention relates to a catalytic process for manufacturing epoxides such as ethylene oxide, propylene oxide, butylene oxides and other olefin oxides from the corresponding olefins and molecular oxygen, and it has for its object to provide a novel and improved process for this purpose.

Another object of the invention is to attain more complete uniformity and easier control of transformation, and a higher yield, concentration and purity of the product, than has heretofore been possible in a process of the above type.

Various other objects and advantages will be apparent as the nature of the invention is more fully disclosed.

It is known to produce olefin oxides, particularly ethylene oxide, by reacting gaseous olefin hydrocarbons such as ethylene with molecular oxygen in the vapor phase in the presence of silver containing catalysts. Various improvements have hitherto been made in this process as to the catalyst preparation, reaction conditions and technical instrumentations. Fluidized-bed technique has also been introduced and applied commercially. In these vapor phase catalytic oxidations, however, it is very difficult to accomplish this conversion uniformly and selectively at the surface of the solid catalyst, so that it is necessary to process with highly diluted olefin gas mixture to reduce further oxidation. In consequence, the concentration of the epoxide in the reacted gas is so low as to make the recovery of the product uneconomical. It is also difficult to obtain a satisfactory yield. Another drawback inherent to the vapor phase process is seen in the fact that the epoxidation of olefin hydrocarbons other than ethylene is hardly successful in the industrial application, owing to the accompanying side-reactions, e.g. further oxidation and combustion.

I have discovered that it is possible to obtain highly uniform conversion and a satisfactory yield, not only with ethylene but also with propylene, butylene and other unsaturated non-benzenoid hydrocarbons, by reacting the unsaturated compounds with molecular oxygen in the liquid phase which is effected by using high-boiling and chemically indifferent organic liquids, in the presence of finely divided catalysts which are suspended in the liquid. It has further been found that in the process of the present invention the reaction temperature can materially be lowered in comparison with that used in the vapor phase process without reduction of the conversion rate, providing efficient contact between the gas and the liquid system under suitable partial pressures of the reactant gases, namely the olefin compound and the oxygen, is secured. Thus, in accordance with the present invention, the side-reactions such as further oxidation and combustion, as well as the oxidative deterioration of the solvent liquids are reduced to a minimum; the epoxide is obtained in a good purity and in a concentration as high as twenty to thirty percent of the resulting gas mixture, so as to permit easy and economical recovery of the product and recycling of the unreacted olefin gas for re-use in the process.

According to the procedure disclosed herein, it is possible to process advantageously not only ethylene but also its higher homologues such as propylene and butylenes which cannot be processed profitably in the vapor phase methods hitherto known; furthermore, it is found by experiment that, in the latter cases, the transformation may be controlled such that other useful oxygenated products are produced in addition to the corresponding epoxides. Thus, as is shown in the following examples, in the case of propylene as the starting olefinic material a substantial yield of acrolein may be obtained along with the formation of propylene oxide; and in the cases of butylenes and isobutylene a considerable amount of acetic acid and other oxygenated products such as vinyl methyl ketone, crotonic aldehyde, and methylacrolein may be produced in addition to the butylene oxides.

The catalysts employed in this invention are those containing silver, copper, or both, preferably in the oxide form, which are finely divided as such or deposited on a finely pulverized carrier such as silica gel, alumina gel, chromia gel, or other porous inorganic materials which are stable to heat and oxidation. These oxide catalysts are partially reduced to the metallic state in the course of the reaction in the process of the present invention, and in this partially reduced state which is defined by the reaction conditions employed such as temperature, partial pressures and concentrations of the reactants, the catalyst exhibits a stationary activity for the conversion. This stationary state of the catalyst can also be established from the metallic side; namely, a metallic catalyst which may be prepared by previously reducing appropriate oxides or easily reducible salts such as formate, acetate or other carboxylates of those metals mentioned above, can also exhibit about the same catalytic activity as an oxide catalyst. As for the metallic catalysts for the process of the present invention, colloidal dispersions of metallic silver and/or copper in an appropriate medium such as fatty acids are found to be especially stable and effective for the high-temperature conversions. In consequence of the above considerations, it has also been found that the catalysts containing easily reducible or oxidizable salts of silver and copper such as carbonates, carboxylates and halides are effective without any previous treatments. In this connection it will be understood by those skilled in the art that various other elements especially those of transition groups which exhibit certain redox activities such as iron, cobalt, nickel, palladium and platinum can be used as co-catalyst to improve the oxidation-reduction susceptibility of the catalysts prepared on silver or copper basis.

As the solvent liquids which serve to maintain the liquid phase for the conversion characteristic to the present invention, a variety of organic liquids may be used which are stable to heat and oxidation, chemically indifferent, and high-boiling or non-volatile; dialkyl phthalates, trialkyl and triaryl phosphates, aromatic nitro compounds, high-boiling carboxylic acids and esters are invariably satisfactory for the purpose of the present invention. These organic substances can be used without any serious deterioration for a suffciently long time, provided that, in accordance with the present invention, a sufficient partial pressure of the olefinic component is maintained over that of the oxygen charged in the reaction system.

In carrying out the process of the present invention a vapor mixture of the olefinic hydrocarbon and the molecular oxygen or the oxygen containing gas is intimately mixed with the liquid system in which the finely divided catalyst is suspended by a mechanical agitation or by an jet-type mixing, and the liquid system is heated or eventually cooled by an external heating or cooling. The reaction takes place even at a temperature of 150° C. in most cases but in order to obtain more favorable rates, it is preferred that the material be heated at a temperature of from 180° to 250° C. Higher temperatures may be employed with suitable solvent liquids, if desired. The optimum temperature varies with the kind of the olefin component and with the partial pressure of the oxygen employed. Thus, with ethylene as the starting olefinic material a temperature of from 200° to 220° C. is suitable for the production of ethylene oxide; whereas with propylene as the starting material, a temperature of from 160° to 180° C. is an optimum for making propylene oxide under slightly superatmospheric pressures and a temperature of from 230° to 250° C. is required for making acrolein and propylene oxide under atmospheric or subatmospheric pressures.

The partial pressure and the concentration of the molecular oxygen employed in the process of this invention should be adapted for the operation pressures of the process. Usually the upper limit of the concentration is restricted to from 20 to 50 percent of the vapor mixture of the olefin and the oxygen gas for the sake of safety from explosion. However, with suitable precautions and instrumental techniques a higher concentration may be used profitably, but an excessive oxygen concentration is prohibitive from the standpoint of solvent deterioration, so that the practical upper limit of the oxygen concentration is in the range of from 30 to 50 percent on the pure olefin gas basis.

The process of the present invention may be operated under subatmospheric, atmospheric or superatmospheric pressures but the preferred operation pressure ranges from 0.8 to 5 atm. absolute.

From the view-point of industrial application the catalytic process of the present invention is best carried out on the basis of the continuous-operating, non-regenerative system, although a regenerative system may also well be applicable, in which, for example, the reaction takes place between the olefinic compound and the oxide catalyst in the absence of molecular oxygen and the used catalyst, deprived of oxygen, is continuously removed from the reactor and then regenerated by re-oxidizing in a separate regenerator. In the non-regenerative system the vapor mixture of the olefinic compound and the oxygen gas is led into a reaction chamber involving the liquid reaction phase, in which it is intimately mixed with the liquid system containing the finely divided solid catalyst in a suspensoidal state by proper agitation such as, for example, by jet-mixing with the inlet gas; the product vapors together with the unreacted gases are continuously withdrawn from the reaction chamber through conventional dephlegmation, and the epoxide formed is separated from the rest gases by fractional condensation or absorption with or without appropriate solvents at lowered temperatures; the unreacted gases thus separated are conveniently recycled to the reaction chamber after proper treatments such as separation of carbon dioxide and other indifferent gases involved.

The following examples are illustrative only and are not to be considered as limiting the invention.

EXAMPLE 1

This example, showing reactions between olefins and the oxide catalysts in the absence of molecular oxygen, is presented for the purpose of illustrating the characteristics of the catalytic conversion in the process of the invention.

(A) Into a suspensoidal mixture of dibutyl phthalate (200 milliliters) and a silver oxide catalyst (60 grams) containing 38 percent by weight of silver supported on a silica gel powder (ca. 250 mesh) was introduced, under high-speed stirring, an ethylene gas of 75 percent purity, the rest being saturated or inert gases, at a rate of 13 milliliters per minute, while the liquid phase was maintained at a temperature of 220° C. The gas and vapors issuing from the liquid phase were passed through a conventional, air-cooled dephlegmater, a water-cooled trap, and finally a trap cooled by Dry Ice methanol mixture to −70° C., where they were partially condensed. The non-condensable gas was collected in a constant-pressure gasometer over a saturated sodium chloride solution as sealing liquids. After 1.20 liters of the ethylene gas has been thus treated, 1.10 milliliters condensate liquids and 0.78 liter non-condensable gases were obtained. The non-condensables were analyzed as consisting of 51.3 percent ethylene, 7.7 percent carbon dioxide and the rest saturated or inert gases which contained neither carbon monoxide nor oxygen. The liquid condensate distilled almost completely at 10° to 13° C., giving 0.92 gram distillate which dissolved completely in cold water and was determined as quantitatively consisting of epoxide by hydrogen chloride addition method. No indication of the presence of aldehyde was found in the distillate. The remaining traces of the condensate reacted neutral to litmus. The results obtained, together with the analysis data of silver in the used catalyst, showed that one third of the silver oxide in the catalyst reacted with ethylene to give 55 percent conversion of the ethylene treated, yielding ethylene oxide to 94 percent of the ethylene reacted.

(B) Employing the same procedure described above, 2.50 liters of pure propylene gas were reacted with the silver oxide catalyst at a rate of 40 milliliters per minute at a reaction temperature of 180° C. 1.15 grams of liquid condensates, freed from unreacted propylene, were obtained which upon subsequent fractional distillation gave two main fractions boiling at 34° to 36° C. (1.00 gram) and at 50° to 53° C. (0.13 gram), respectively.

The lower and the higher boiling fraction was identified as propylene oxide and as acrolein, respectively. The non-condensable gas (2.00 liters) contained only 1.1 percent carbon dioxide besides unreacted propylene. The analysis data showed that about two thirds of the silver oxide were consumed to give a propylene conversion of 20 percent, of which 85 percent corresponded to the epoxidation, 11 percent to the formation of acrolein, and 2 percent to the combustion leading to the formation of carbon dioxide only, based on the moles of the propylene reacted.

(C) Employing the general procedure described above, 6.5 grams of cyclohexene were reacted with 80 grams of the silver oxide catalyst at a temperature of 200° C. at a rate of 0.18 gram per minute. The effluent gave 6.7 grams of liquid condensates and 0.530 liter of non-condensable gas. The liquid condensates contained 0.2 gram water, and the rest, upon dehydration with anhydrous potassium carbonate and after recovery of unreacted cyclohexene by fractional distillation, yielded 1.5 grams of cyclohexene oxide fraction boiling at 129° to 132° C. The non-condensable gas contained carbon dioxide only. Up to 85 percent of the silver oxide in the catalyst were consumed, and 26 percent of the cyclohexene charged were converted, yielding the epoxide to 80 percent of the theoretical.

(D) Using the general procedure of Example 1–(A) with ethylene as the olefinic component, the reactions of various metal oxide catalysts were investigated comparatively: (1) a silver oxide powder which was prepared by precipitating a silver nitrate solution with sodium hydroxide yielded upon reaction at 200° C. 83.4 percent; (2) a yellow mercury oxide powder at 230° C. 60 percent; (3) a cupric oxide, precipitated from a nitrate solution on a fine powder of silica gel, at 235° C. 88.2 percent; (4) a palladium oxide supported on silica gel, prepared by calcination of a silica gel powder impregnated with palladium nitrate, at 230° C. 67 percent of ethylene oxide, respectively. The rest of the product was mainly carbon dioxide in every case.

EXAMPLE 2

Employing the same procedure as described in Example 1–(A) and using the spent catalyst containing partially reduced silver oxide, an ethylene gas mixture containing 12 percent of molecular oxygen was introduced into the liquid reaction phase at a rate of 20 milliliters per minute at 220° C. An initial conversion of 35 percent was obtained. The conversion decreased gradually to a constant value of about 14 percent, leading to a selective yield of ethylene oxide of about 86 percent.

EXAMPLE 3

To a suspensoidal mixture of nitrobenzol (200 milliliters) and a mixed oxide catalyst containing 40 percent by weight of copper and silver oxides in equal amounts, supported on a fine powder of silica gel (120 grams) in a stirred reaction vessel with a reflux cooler was introduced an ethylene gas containing 20 percent by volume of molecular oxygen at a rate of 20 milliliters per minute at the reflux temperature of nitrobenzol. An ethylene conversion of about 40 percent was initially observed, which, later on, settled to a stationary value of 25 percent, leading to a selective yield of ethylene oxide of about 87 percent of the theoretical.

EXAMPLE 4

In a cylindrical, stirred reactor of 250 milliliter capacity containing a colloidal dispersion of silver which was made by reducing a melted mixture of silver stearate (75 grams) and stearic acid (100 grams) with molecular hydrogen at 180° C., was introduced an ethylene gas containing 15.3 percent by volume of molecular oxygen at a rate of 100 milliliters per minute at 230° C. An ethylene conversion of 24.4 percent and a selective yield of ethylene oxide of 90.3 percent was obtained.

EXAMPLE 5

Using a vertical cylindrical reactor in which the liquid reaction phase containing the high-boiling solvent liquid and the finely divided catalyst powder was maintained in a suspensoidal state of efficient agitation by introducing the reactant gas mixture with a high speed through a jet placed at the bottom of the reactor, a series of continuous runs was made with ethylene and oxygen gas as the reactant material under various reaction conditions. In Table I are listed the results of experiments with varying reaction temperature in which a space velocity (volume of total gas mixture per volume of liquid phase per hour) of 80 and an oxygen concentration of 15 percent by volume was used. Table II shows the results obtained with varying space velocity at a reaction temperature of 220° C., using a reactant gas mixture containing 20 percent of oxygen gas. A silver oxide catalyst containing 40 percent by weight of silver oxide supported on silica gel and dibutyl phthalate as the solvent liquid was used in equal proportion in both series of runs throughout.

Table I

| Reaction Temperature, ° C. | Percent Conversion of Ethylene | Selective Yield (percent) of Ethylene Oxide |
| --- | --- | --- |
| 180 | 8 | 96 |
| 200 | 18 | 92 |
| 230 | 25 | 86 |
| 250 | 35 | 80 |

Table II

| Space Velocity | Percent Conversion of Ethylene | Selective Yield (percent) of Ethylene Oxide |
| --- | --- | --- |
| 80 | 35 | 87 |
| 300 | 25 | 90 |
| 850 | 15 | 91 |
| 1,000 | 11 | 94 |

EXAMPLE 6

Employing the general procedure of Example 5, a series of continuous experiments was made with a propylene gas containing 21 percent of molecular oxygen at various reaction temperatures, using a space velocity of 24. The results obtained are shown in Table III.

Table III

| Reaction Temperature ° C. | Percent Conversion of Propylene | Selective Yield (percent) of— | |
| --- | --- | --- | --- |
| | | Propylene Oxide | Acrolein |
| 160 | 16 | 87 | 10 |
| 180 | 30 | 86 | 10.5 |
| 200 | 40 | 70 | 19.5 |
| 230 | 44 | 41 | 42 |

EXAMPLE 7

Employing the same procedure as described in Example 2, a butylene gas consisting mainly of alpha butylene (97 percent purity) was reacted with molecular oxygen at 180° C. Alpha butylen oxide was obtained with a selective yield of 86 percent along with acetic acid and methyl vinyl ketone.

EXAMPLE 8

In the same manner as in Example 7, a butylene gas consisting mainly of beta butylene (90 percent purity) was treated in the presence of molecular oxygen at a reaction temperature of 200° C. Beta butylene oxide was obtained in a selective yield of 90 percent along with crotonic aldehyde and acid.

EXAMPLE 9

In the same manner as in Example 7, an isobutylene gas of 98 percent purity was reacted with molecular oxygen at a reaction temperature of 200° C. Isobutylene oxide was obtained in a selective yield of 85 percent along with methylacrolein and some unsaturated carboxylic acids.

EXAMPLE 10

Employing the general procedure of Example 5, a series of continuous experiments was made with a butylene gas consisting mainly of alpha butylene at various reaction conditions. Table IV shows the results obtained by using varying oxygen concentrations in the reactant vapor mixture at a reaction temperature of 180° C. and at a space velocity of about 15.

Table IV

| Concentration of Oxygen percent by Vol. | Percent Conversion of Butylene | Selective Yield (Mole percent) of— | | |
| --- | --- | --- | --- | --- |
| | | Butylene Oxide | Acids [1] | Methyl Vinyl ketone |
| 15.3 | 26 | 81 | 7 | 5 |
| 30.0 | 34 | 77 | 7 | 10 |
| 42.2 | 40 | 76 | 6 | 11 |

[1] Mainly acetic acid.

Table V

| Reaction Temperature, ° C. | Percent Conversion of Butylene | Selective Yield (Mole percent) of— | | |
| --- | --- | --- | --- | --- |
| | | Butylene Oxide | Acids [1] | Methyl Vinyl ketone |
| 140 | 7 | 98.7 | 0 | 0 |
| 160 | 16 | 96 | 0 | 2 |
| 180 | 21 | 85 | 6 | 6 |
| 210 | 33 | 70 | 7 | 13 |

[1] Mainly acetic acid.

In Table V are listed the results of experiments carried out at various reaction temperatures, using a space velocity of 15.

The process as described is not limited to particular olefins mentioned above as the starting olefinic material, but is also applicable to other olefinic compounds which give volatile epoxides.

What I claim is:

1. The process for preparing ethylene oxide which comprises reacting ethylene with molecular oxygen by bringing a vapor mixture of ethylene and an elemental oxygen containing gas, in which the mole ratio of oxygen to ethylene is less than 0.35, in a liquid phase which is effected by using an organic liquid the boiling point of which is higher than that of the resulting oxidation products into contact with a finely divided solid oxidation catalyst selected from the group consisting of copper, copper oxide, silver, silver oxide and mixtures thereof which is suspended in the liquid at a temperature of from 180° to 250° C. and recovering the reaction products as an effluent vapor mixture from said liquid phase.

2. The process for preparing propylene oxide which comprises reacting propylene with molecular oxygen by bringing a vapor mixture of propylene and an elemental oxygen containing gas, in which the mole ratio of oxygen to propylene is less than 0.5, in a liquid phase which is effected by using an organic liquid the boiling point of which is higher than that of the resulting oxidation products into contact with a finely divided solid oxidation catalyst selected from the group consisting of copper, copper oxide, silver, silver oxide and mixtures thereof which is suspended in the liquid at a temperature of from 150° to 230° C. and recovering the reaction products as an effluent vapor mixture from said liquid phase.

3. The process for preparing butylene oxide which comprises reacting butylene with molecular oxygen by bringing a vapor mixture of butylene and an elemental oxygen containing gas, in which the mole ratio of oxygen to butylene is less than 0.5, in a liquid phase which is effected by using an organic liquid the boiling point of which is higher than that of the resulting oxidation products into contact with a finely divided solid oxidation catalyst selected from the group consisting of copper, copper oxide, silver, silver oxide and mixtures thereof which is suspended in the liquid at a temperature of from 130° to 220° C. and recovering the reaction products as an effluent vapor mixture from said liquid phase.

4. The process for preparing isobutylene oxide which comprises reacting isobutylene with molecular oxygen by bringing a vapor mixture of isobutylene and an elemental oxygen containing gas, in which the mole ratio of oxygen to isobutylene is less than 0.5, in a liquid phase which is effected by using an organic liquid the boiling point of which is higher than that of the resulting oxidation products into contact with a finely divided solid oxidation catalyst selected from the group consisting of copper, copper oxide, silver, silver oxide and mixtures thereof which is suspended in the liquid at a temperature of from 130° to 220° C. and recovering the reaction products as an effluent vapor mixture from said liquid phase.

5. The process for preparing propylene oxide along with acrolein which comprises reacting propylene with molecular oxygen by bringing a vapor mixture of propylene and an elemental oxygen containing gas in a liquid phase which is effected by using an organic liquid the boiling point of which is higher than that of the resulting oxidation products into contact with a finely divided solid oxidation catalyst selected from the group consisting of copper, copper oxide, silver, silver oxide and mixtures thereof which is suspended in the liquid at a temperature of from 220° to 300° C. and recovering the reaction products as an effluent vapor mixture from said liquid phase.

6. The process for preparing alpha butylene oxide along with methylvinyl ketone which comprises reacting alpha butylene with molecular oxygen by bringing a vapor mixture of alpha butylene and an elemental oxygen containing gas in a liquid phase which is effected by using an organic liquid the boiling point of which is higher than that of the resulting oxidation products into contact with a finely divided solid oxidation catalyst selected from the group consisting of copper, copper oxide, silver, silver oxide and mixtures thereof which is suspended in the liquid at a temperature of from 220° to 300° C. and recovering the reaction products as an effluent vapor mixture from said liquid phase.

7. The process for preparing beta butylene oxide along with crotonic aldehyde which comprises reacting beta butylene with molecular oxygen by bringing a vapor mixture of beta butylene and an elemental oxygen containing gas in a liquid phase which is effected by using an organic liquid the boiling point of which is higher than that of the resulting oxidation products into contact with a finely divided solid oxidation catalyst selected from the group consisting of copper, copper oxide, silver, silver oxide and mixtures thereof which is suspended in the liquid at a temperature of from 210° to 300° C. and recovering the reaction products as an effluent vapor mixture from said liquid phase.

8. The process for preparing isobutylene oxide along with methylacrolein which comprises reacting isobutylene with molecular oxygen by bringing a vapor mixture of isobutylene and an elemental oxygen containing gas in a liquid phase which is effected by using an organic liquid the boiling point of which is higher than that of the resulting oxidation products into contact with a finely divided solid oxidation catalyst selected from the group consisting of copper, copper oxide, silver, silver oxide and mixtures thereof which is suspended in the liquid at a temperature of from 200° to 300° C. and recovering the reaction products as an effluent vapor mixture from said liquid phase.

9. A process for preparing olefin oxides which comprises reacting a gaseous monoolefin containing from 2 to 4 carbon atoms with molecular oxygen by passing a vapor mixture of said monoolefin and an elemental oxygen containing gas into a liquid phase of an organic liquid the boiling point of which is higher than that of the resulting oxidation products and in which a finely divided solid oxidation catalyst selected from the group consisting of copper, copper oxide, silver, silver oxide and mixtures thereof is suspended, said vapor mixture being in contact with said catalyst at a temperature of from about 150 to about 300° C., and recovering the reaction products as an effluent vapor mixture from said liquid phase.

10. A process of preparing ethylene oxide which comprises passing a vapor mixture of ethylene and elemental oxygen containing gas into a liquid phase selected from the group consisting of dibutyl phthalate and nitrobenzol, said liquid phase having suspended therein a finely divided catalyst selected from the group consisting of copper, copper oxide, silver, silver oxide and mixtures thereof, reacting said mixture while in contact with said catalyst at a temperature of from 180 to 250° C., the mole ratio of oxygen to ethylene being less than 0.35; and continuously recovering the reaction products as an effluent vapor mixture from said phase.

References Cited in the file of this patent

UNITED STATES PATENTS

| | | |
|---|---|---|
| 2,197,101 | Eaglesfield | Apr. 16, 1940 |
| 2,383,711 | Clark | Aug. 28, 1945 |
| 2,513,389 | Young et al. | July 4, 1950 |
| 2,530,509 | Cook | Nov. 21, 1950 |
| 2,650,927 | Gasson | Sept. 1, 1953 |
| 2,741,623 | Millidge | Apr. 10, 1956 |
| 2,780,634 | Robertson | Feb. 5, 1957 |
| 2,780,635 | Gardner | Feb. 5, 1957 |
| 2,784,202 | Gardner | Mar. 5, 1957 |